United States Patent [19]

Nakano

[11] Patent Number: 5,245,169

[45] Date of Patent: Sep. 14, 1993

[54] DATA INPUT/OUTPUT APPARATUS

[75] Inventor: Yuji Nakano, Kawasaki, Japan

[73] Assignee: Canon Kabushiki Kaisha, Tokyo, Japan

[21] Appl. No.: 648,147

[22] Filed: Jan. 30, 1991

[30] Foreign Application Priority Data

| Feb. 1, 1990 [JP] | Japan | 2-023207 |
| Feb. 1, 1990 [JP] | Japan | 2-023208 |
| Feb. 1, 1990 [JP] | Japan | 2-023209 |
| Feb. 1, 1990 [JP] | Japan | 2-023210 |

[51] Int. Cl.$^5$ .............................................. G06K 7/00
[52] U.S. Cl. .................... 235/486; 439/326; 40/156; 235/483; 361/686; 361/684; 361/680
[58] Field of Search ............ 235/486, 482, 483; 40/156, 652; 360/2, 96.5; 359/827; 248/441.1; 361/394, 380, 390

[56] References Cited

U.S. PATENT DOCUMENTS

| 3,920,303 | 11/1975 | Pittman et al. | 439/326 |
| 4,185,882 | 1/1980 | Johnson | 439/326 |
| 4,523,087 | 6/1985 | Benton | 235/380 |
| 4,678,252 | 7/1987 | Moore | 439/326 |
| 4,931,622 | 6/1990 | Ohtsuki et al. | 235/486 |

FOREIGN PATENT DOCUMENTS

| 1550374 | 11/1967 | France | 40/156 |
| 56-140457 | 11/1981 | Japan. | |
| 0067692 | 3/1990 | Japan | 235/441 |
| 0192233 | 2/1923 | United Kingdom | 248/441.1 |

OTHER PUBLICATIONS

U.S. Application Ser. No. 07/644,381 filed Jan. 22, 1991, claims 1-8, FIGS. 1-15.
U.S. Application Ser. No. 07/634,471 filed Dec. 27, 1990, claims 1-9, FIGS. 1-41 and abstract.

Primary Examiner—John Shepperd
Assistant Examiner—Esther Chin
Attorney, Agent, or Firm—Fitzpatrick, Cella, Harper & Scinto

[57] ABSTRACT

A data input/output apparatus comprises a card mounting portion on which a data memory card having data input keys is freely, detachably mounted. The mounting portion has an opening so that the keys on the mounted card can be operated. In addition, the card is routed to the mounting portion by a guide means and then mounted in the mounting portion. Then, the data memory card is positioned in the main unit of the data input/output apparatus accurately.

10 Claims, 7 Drawing Sheets

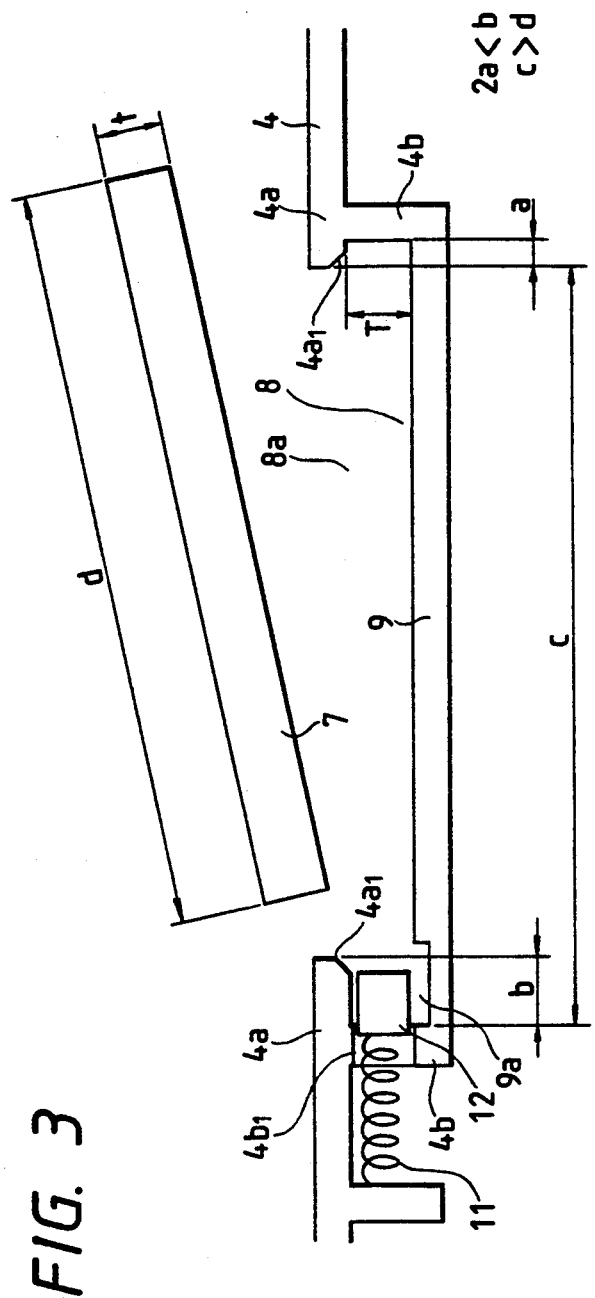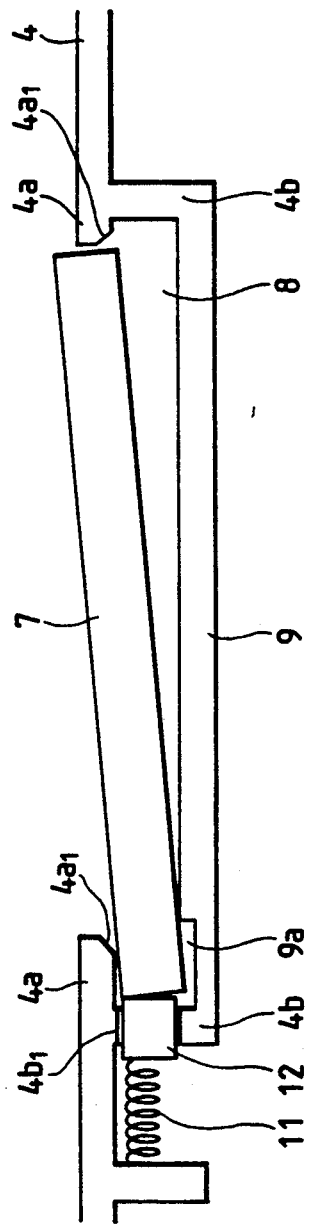

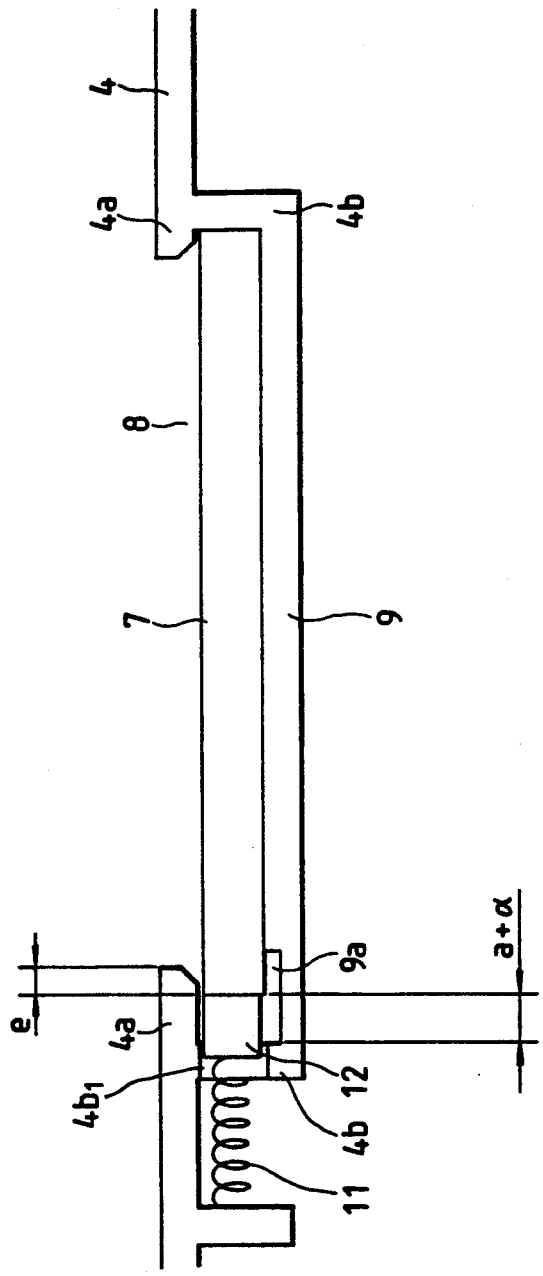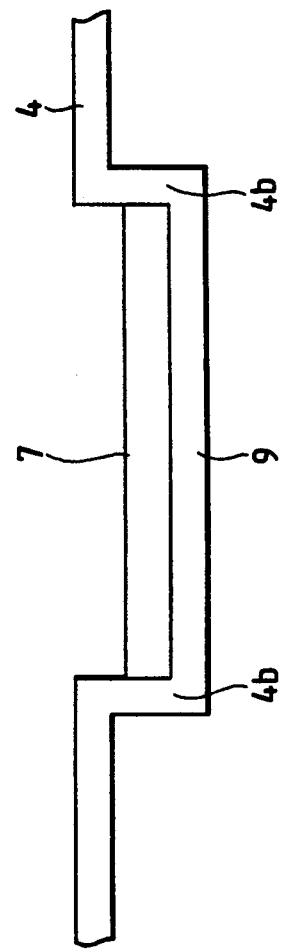

DATA INPUT/OUTPUT APPARATUS

BACKGROUND OF THE INVENTION

1. Field of the Invention

The present invention relates to a data input/output apparatus having a mounting portion on which an electronic telephone directory card or other data memory card is freely detachably mounted.

2. Related Background Art

A facsimile system or other data input/output apparatus has incorporated various advanced functions recently, and is getting more and more multifunctional. With the advent of the advanced and multifunctional facsimile system, it becomes possible to register stations to be called in abbreviated dial sets. The number of operation input switches on an operator panel tends to increase. The increase in the number of switches causes such a problem that individual switches are made too compact and thereby the operability is deteriorated.

In a new system disclosed, for example, in FIG. 1 of Japanese Patent Application Laid-open No 56-140457, or in U.S. application Ser. No. 07/468,869, filed on Jan. 23, 1990, now U.S. Pat. No. 5,075,686, one operation input switch contains multiple input functions and selects any input function.

In compliance with the multifunctional move, an IC ROM card is installed to further multiply the functions of a facsimile system. The ROM card is used with its end connected to a connector of the facsimile system, thus increasing memory capacity of the main unit of the facsimile system.

However, when one facsimile system is shared among multiple users, the destinations or stations to be called differ from person to person. In the aforesaid prior method, the number of registrable abbreviated dial sets is limited. The memory capacity is also limited. Therefore, all of the multiple users cannot register their intended names in memory of the main unit of a facsimile system.

To solve these problems, in U.S. application Ser. No. 07/538,344 proposes a facsimile system comprising a mounting portion on which an electronic telephone directory card or other data memory card having data input keys can be freely detachably mounted, and the mounted data memory card can be operated externally. In this proposal, the mounting portion for mounting a card has a recess 21 in the main unit of the facsimile system and measures the size of the data memory card as shown in FIG. 10. Cards are inserted into the recess 21 from above or sideways, and then shifted laterally with springs to be positioned properly.

A card thus mounted works to communicate data with the main unit of a facsimile system. Information specified by operating keys on the card is sent as optical information from light emitting elements on the back of the card into light receiving elements in the main unit of the facsimile system.

However, in the foregoing facsimile system, a card is placed on the bottom of the recess 21 in the mounting portion and then positioned. Therefore, the card must be arranged so that no gap will be created between the card and the bottom of the recess 21. If a gap is created between the card and facsimile system, light emitting elements on the back of the card and light receiving elements in the main unit of the facsimile system are positioned incorrectly. Due to insufficient light or incident external light, the light receiving elements may receive incorrect optical information.

The reason why a gap is created between a card and the bottom of the recess of the mounting portion is in that the card weighs only several grams. Therefore, when the card is positioned askew, the end of the card is galled to the side wall of the recess 21 of the mounting portion. As a result, the card is not brought into intimate contact with the bottom of the recess of the mounting portion.

When the facsimile system is placed almost horizontally, if a card is put in the recess 21 of the mounting portion correctly, the card is brought into intimate contact with the bottom of the recess 21. However, if the facsimile system is inclined, it becomes difficult for the card to be brought into close contact with the bottom of the recess 21 when only the weight of the card is used for positioning. To solve this problem, the card may be made heavier. However, a card acting as an electronic telephone directory is often put in a purse and carried here and there. It should be compact and light-weight. A heavier card may lead to an increase in costs. Thus, close-contact between the card and the bottom of the recess 21 is dependent of the card weight. When an electronic telephone directory card is mounted in the main unit of a facsimile system, it must be positioned precisely. This requires a user's attention. Moreover, a facsimile system must be installed in a level place. This deprives a user of freedom in arranging a facsimile system.

To solve these problems, a facsimile system ensuring close-contact between a card and a mounting portion in the main unit has been proposed in an earlier application (U.S. application Ser. No. 07/634,471) Also proposed in another earlier application is to enable a card and a mounting portion to be positioned with a simple configuration. It has been requested that a card and a mounting portion will be positioned assuredly and that the card can be mounted onto the mounting portion easily.

SUMMARY OF THE INVENTION

The object of the present invention is to solve the aforesaid problems, so that a card acting as an electronic telephone directory can be mounted onto a mounting portion easily.

Another object of the invention is to approximate the depth of a card mounting portion to the thickness of a card.

These and other objects of the invention will be apparent in conjunction with the embodiments described below.

BRIEF DESCRIPTION OF THE DRAWINGS

FIG. 3 is a detailed view of the mounting portion shown in FIG. 2.

FIG. 4 is a detailed view of the mounting portion shown in FIG. 3 when a card is mounted.

FIG. 5 is a detailed view of the mounting portion in FIG. 3 with a card mounted.

FIG. 6 is a lateral view of the mounting portion in FIG. 5 which is viewed from another side.

DETAILED DESCRIPTION OF THE PREFERRED EMBODIMENTS

Figure 1:
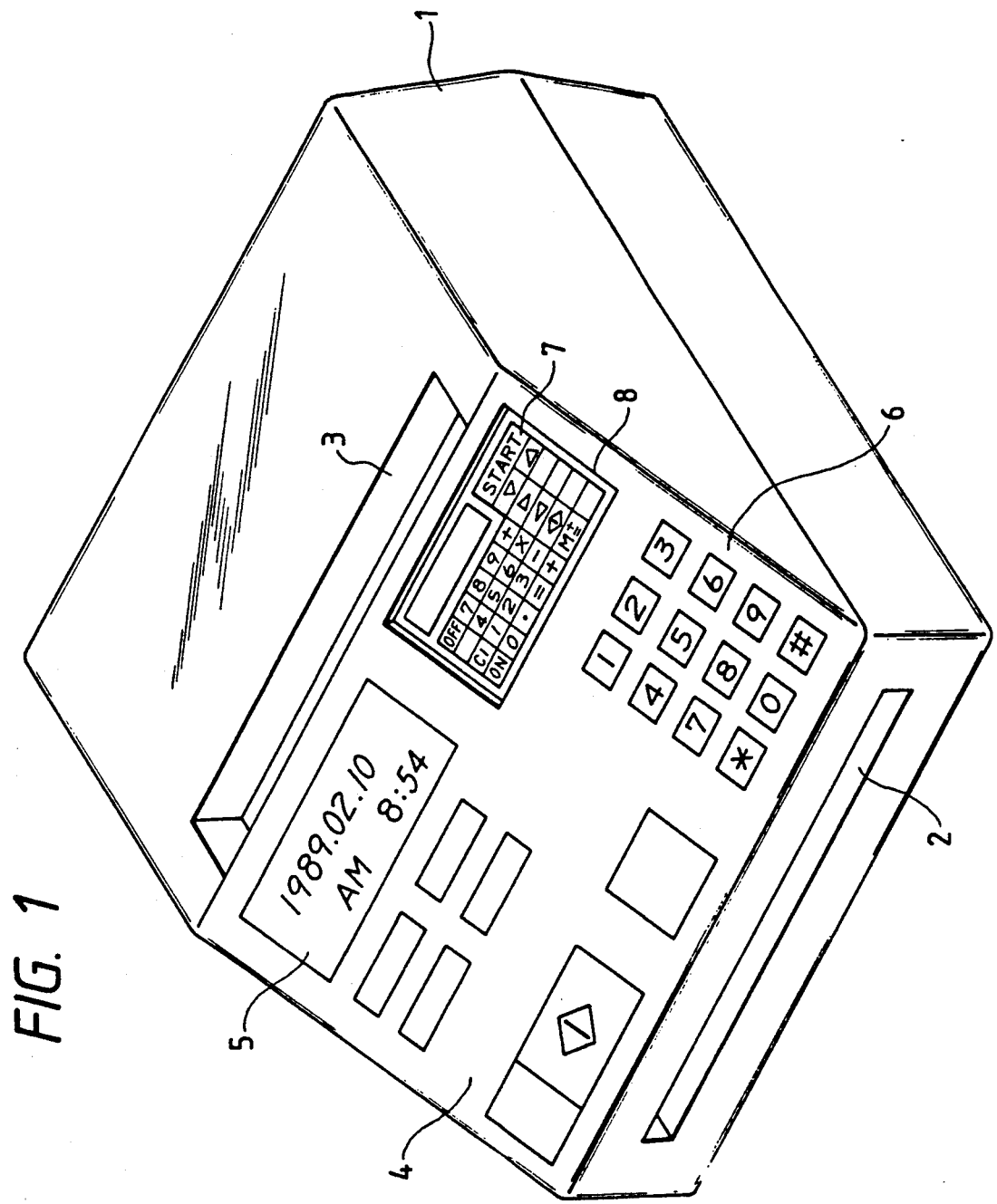
FIG. 1 is a perspective view of an entire system showing a first embodiment of the invention.
Figure 2:
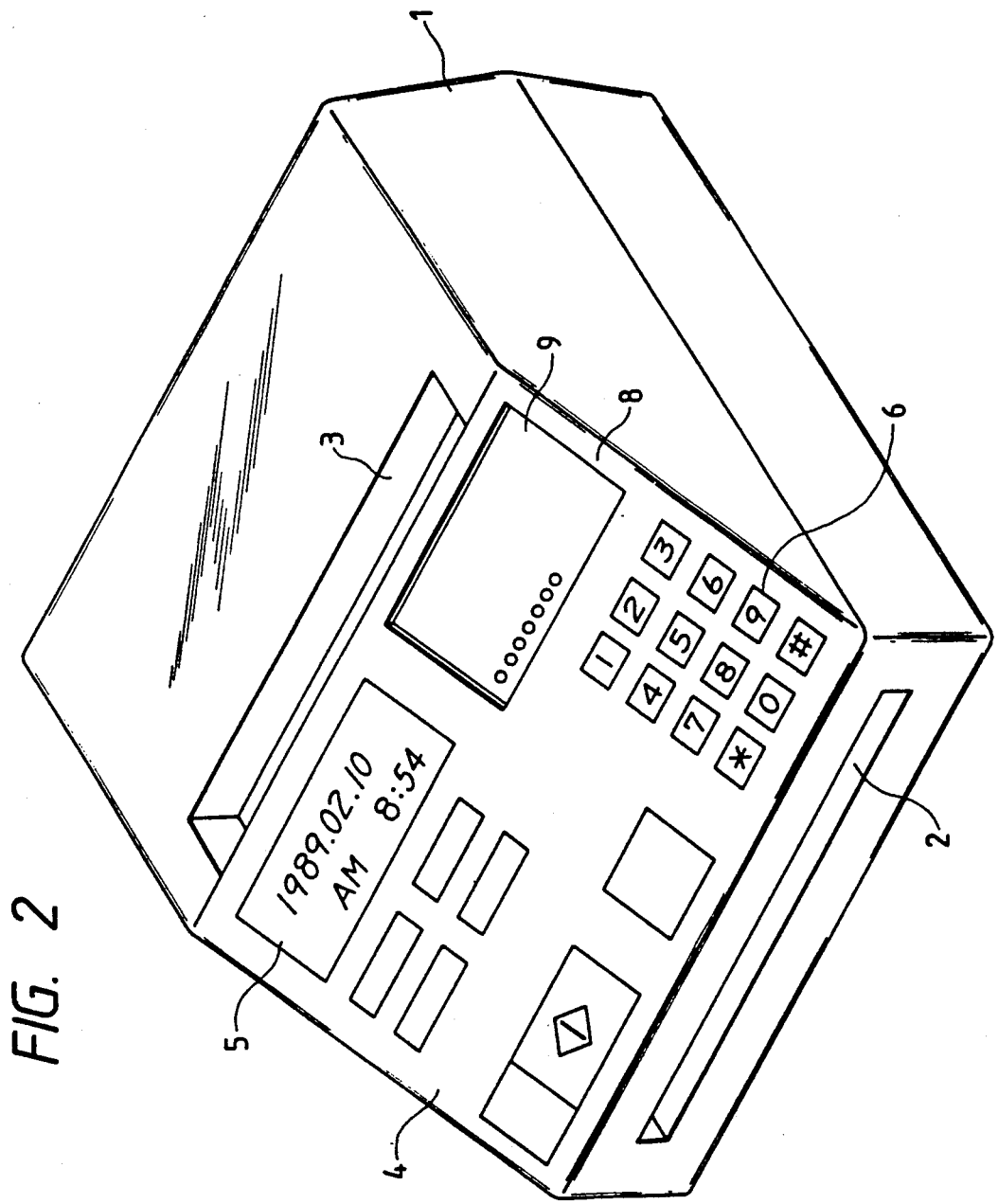
FIG. 2 shows the system in FIG. 1 with a card removed.

An embodiment of the invention is described below in conjunction with the drawings. FIGS. 1 and 2 show the appearance of a facsimile system having an electronic telephone directory. 1 represents a main unit body, and 2 an original insertion slot. 3 is an outlet of originals and recording sheets and is located on the top of the main unit body 1. 4 is an operator panel inclining forward from the top of the main unit 1. On the operator panel 4, a display 5, ten-key pad 6, and other various keys are arranged. The operator panel 4 is provided with a mounting portion 8 onto which a data memory card 7 is mounted. The mounting portion 8 forms a recess, having an opening 8a for attaching and detaching the data memory card 7 and for operating keys on the card 7 externally. The opening 8a has almost the same size as the card 7. The length of the opening 8a is slightly shorter than that of the card 7, and the width of the opening 8a, slightly longer than that of the card 7. This is intended to help insert the card 7 from the opening 8a and prevent it from coming off. In the mounting portion 8, an installation unit 9 on which the card 7 is placed is formed integrally with the operation panel 4 as shown in FIGS. 3, 4, and 5. The installation unit 9 includes an array of light receiving elements $N_1$ to $N_7$. On the side of the inner region of the mounting portion 8, a spring 11 or a pressing member is attached to a part of the operation panel 4. The periphery of the mounting portion 8 is formed with side walls 4b. A sliding member 12 at the tip of the spring 11 is movably provided in the hole $4b_1$ of one side wall 4b. The peripheral portions 4a on the shorter sides of the opening of the mounting portion 8 are protruded to prevent the card from coming off. The peripheral portions on the longer sides of the opening are not protruded as shown in FIG. 6, helping to mount a card. One end of the card 7 is pressed with a force of the spring 11 or a pressing member. Thus, another end of the card 7 is pushed against the side wall 4b. The lower end corners of the peripheral portions 4a of the shorter sides of the opening form chamfered portions $4a_1$ to help insert the card.

The amount of protrusion b of the periphery 4a in the region having the spring 11 is double the amount of protrusion a of the opposing side of the periphery 4a, that is to say, 2a<b.

On the other hand, a distance c from the portion of the side wall 4b having the spring 11 to the end surface (left end surface in FIG. 3) of the opposing peripheral portion 4a is set slightly longer than the longer side d of the card.

A bottom under the side of the periphery 4a having the pressing member is deeper than other parts of the bottom, forming a dent 9a. This helps insert the card. This recessed region starts from a portion which is closer to the center than the inner end of the peripheral portion 4a having the pressing member.

The tip of the sliding member 12 is usually pulled inside from the protruded position of the peripheral portion 4a and comes further inside when the card 7 is mounted. This helps insert the card.

Figure 7:
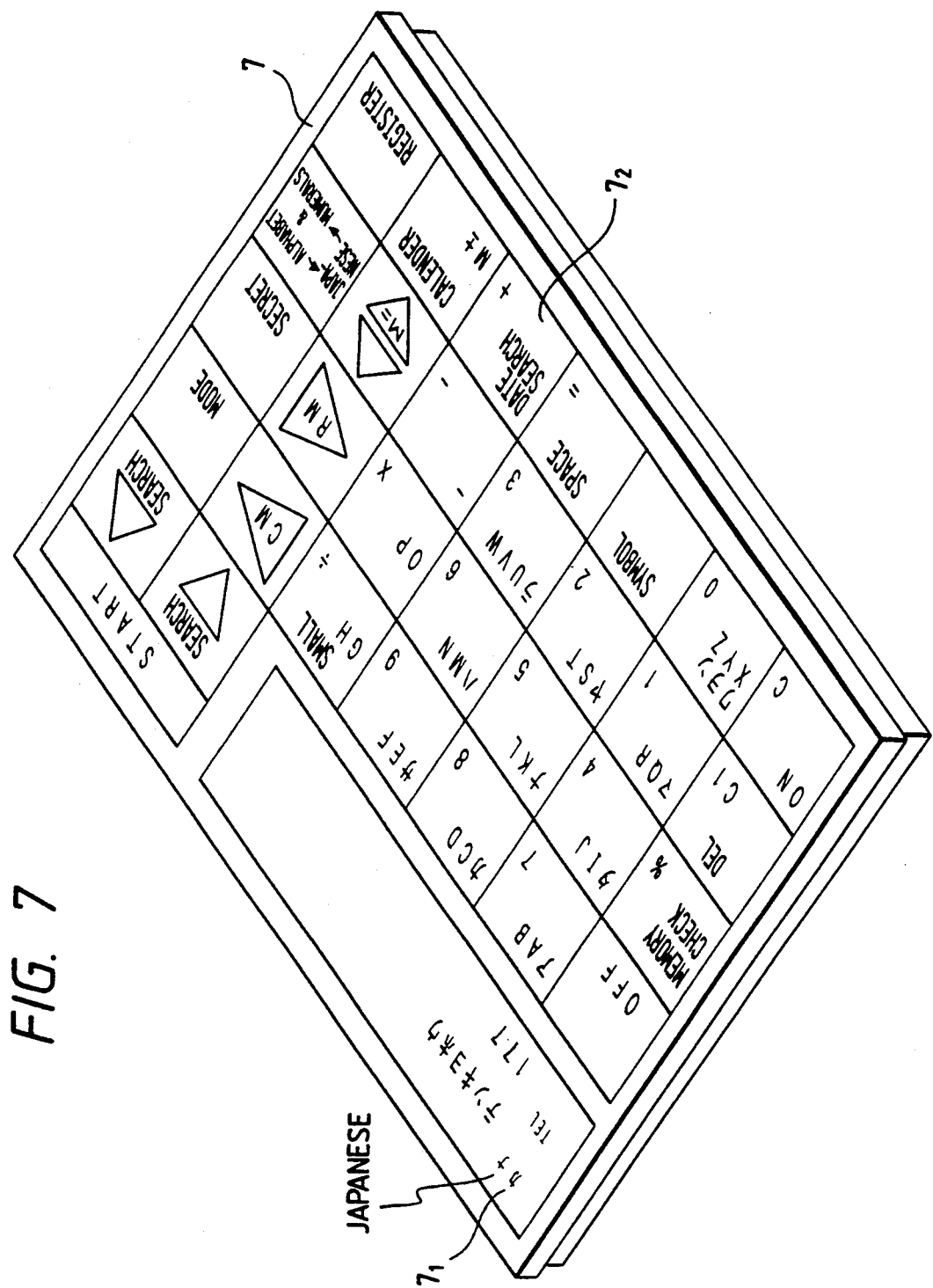
FIG. 7 is a perspective view of the data memory card used in the system shown in FIG. 1 which is viewed from the front.
Figure 8:
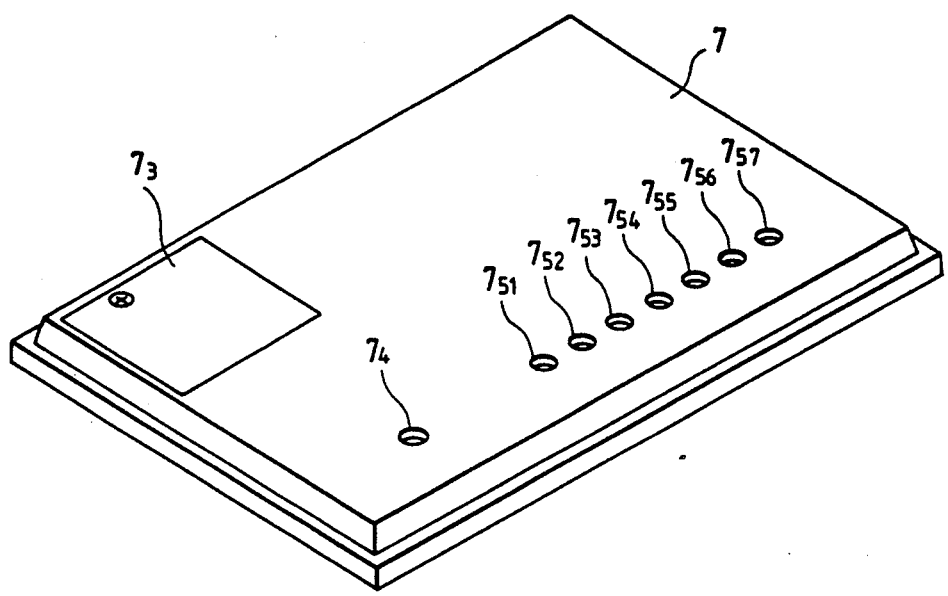
FIG. 8 is a perspective view of the data memory card shown in FIG. 7 which is viewed from the back.
Figure 9:
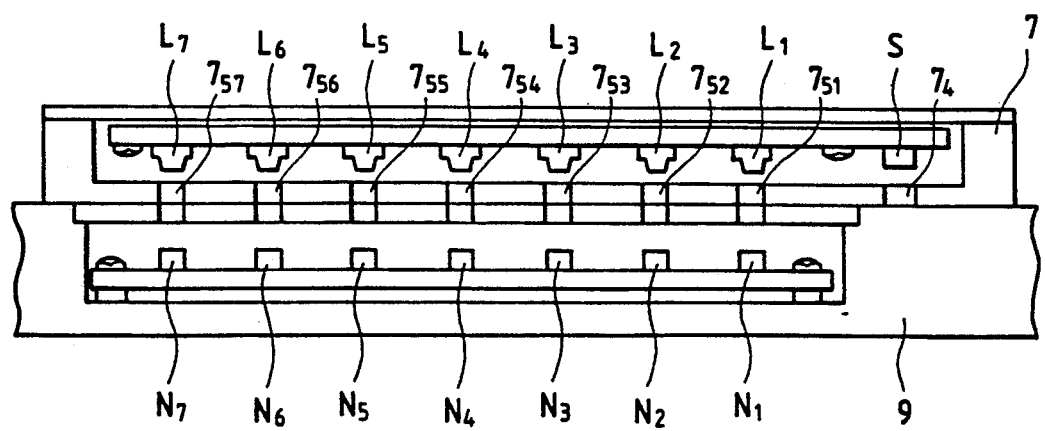
FIG. 9 shows a relationship between the light receiving unit shown in FIG. 2 and the light emitting unit shown in FIG. 8.
Figure 10:
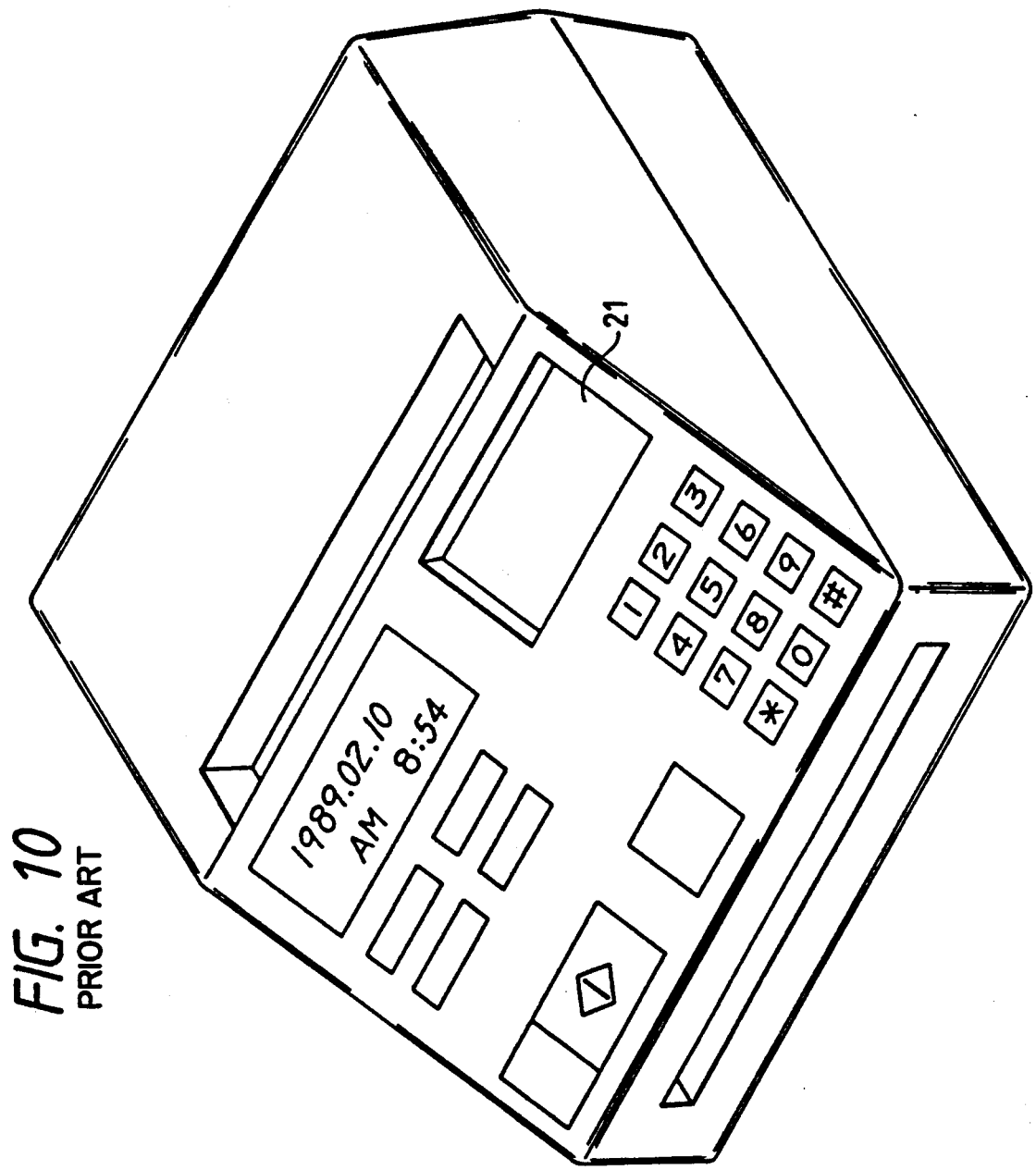
FIG. 10 shows a prior system.

On the surface of the data memory card 7, a display $7_1$ and various data keys $7_2$ are arranged as shown in FIG. 7. The data keys $7_2$ actuates the function of a telephone directory by identifying a data item contained in the card 7. The display $7_1$ displays the data item identified. On the back of the card 7, a battery cover $7_3$, a RESET switch window $7_4$, and LBD windows $7_{51}$ to $7_{57}$ are arranged as shown in FIG. 8. The battery cover $7_3$ is fixed to the card 7 with screws, wherein a lithium battery is accommodated. When the center of the RESET switch window $7_4$ is pressed with a pin, a RESET switch S within the card 7 is actuated to clear various data items stored in memory. The LED windows $7_{51}$ to $7_{57}$ transmit light beams of seven light emitting diodes $L_1$, $L_2$, $L_3$, $L_4$, $L_5$, $L_6$ and $L_7$ incorporated in the card. The light emitting diodes $L_1$ to $L_7$ are opposed to seven light receiving elements $N_1$, $N_2$, $N_3$, $N_4$, $N_5$, $N_6$, and $N_7$ as shown in FIG. 9. Depending on the light receiving results of these light receiving elements $N_1$ to $N_7$, a data item selected with keys on the card 7 is input to the main unit of the facsimile system.

The relationship between the thickness t of the card 7 and the depth T of the mounting portion 8 is discussed. The depth T of the mounting portion 8 is approximated to the thickness t of the card 7. This is attributable to the fact that light emitting diodes $L_1$ to $N_7$ of the card 7 and light receiving elements $N_1$ to $N_6$ of the installation unit 9 are positioned more accurately when the depth of the mounting portion 8 is more closely approximated to the thickness of the card 7. However, when the depth T of the mounting portion 8 is too closely approximated to the thickness of a card 7, it becomes impossible to insert one end of the card 7 between the installation section 9 of the mounting portion 8 and peripheral portions 4a. To help insert one end of the card 7 into the mounting portion 8, a chamfered portion $4a_1$ is provided at the lower end corner of a peripheral portion 4a in the region having the sliding member 12. Owing to the chamfered portion $4a_1$, the depth T of the mounting portion 8 can be approximated to the thickness t of the card 7. If the dent 9a is formed in the installation unit 9 or the bottom near the side wall of the mounting portion 8 in the region having the sliding member 12, the depth T of the mounting portion 8 can be approximated to the thickness t of the card 7. In addition, if the portion of the sliding member 12 which touches the card is formed not to come beyond the peripheral portion 4a, it becomes very easy to insert one end of the card between the installation unit 9 and the peripheral portion 4a.

Next, the operations of a facsimile system having the aforesaid configuration are described.

A card 7 is held in such a way that LED windows $7_{51}$ to $7_{57}$ on the back of the card 7 will match light receiving elements $N_1$ to $N_7$ in the data input/output apparatus. While the card 7 is being inclined, one end of the card 7 is inserted between the peripheral portion 4a of the opening 8a and the installation plate 9 against the force of a spring 11 or a pressing member as shown in FIG. 4. At this time, since the portion of the sliding member 12 which touches the card does not come beyond the peripheral portion 4a, what is required is to merely insert one end of the card 7. In the region in which the card 7 touches the sliding member 12, the chamfered portion $4a_1$ is formed. Under the chamfered portion $4a_1$, the dent or recess 9a is formed. Thereby, one end of the card 7 is routed to the dent 9a by the chamfered $4a_1$. Therefore, the card 7 will not gall the mounting portion 8 but come in smoothly. When the card 7 is pushed until the face of the card 7 which touches the sliding member 12 nearly touches the side wall 4b of the mounting portion 8 in the region having a pressing member, a gap is created between the end of the opposing peripheral portion 4a and another end of the card 7. Then, the card 7 goes down beyond the peripheral portions 4a. As a result, the bottom of the card 7 is entirely brought into close contact with the bottom 9 of the mounting portion.

When the card 7 is released from the operations finger, the card 7 is shifted toward the side wall 4b due to the force of the spring 11 or a pressing member as shown in FIG. 5. At this time, the card 7 is restricted vertically by the surface of the installation unit 9 except the dent 9a, and the the right and left peripheral portions 4a, and therefore is positioned securely. Thereby, the card 7 is positioned in a direction parallel with the bottom of the mounting portion 8, and positioned in the mounting portion 8 assuredly. Thus, a gap between light emitting diodes $L_1$ to $L_7$ and light receiving elements $N_1$ to $N_7$ is eliminated. Then, the light emitting diodes and light receiving elements are positioned correctly and correct communication may be made. Keys $7_2$ on the card 7 are visible to the operator through the opening 8a. The operator presses intended keys $7_2$ of the card 7 with his/her finger. Thereby, information specified with the keys $7_2$ on the card 7 is sent as optical information from the light emitting diodes $L_1$ to $L_7$ to the light receiving elements in the main unit of the facsimile system.

To remove the card 7 from the mounting portion 8, while the card 7 is being pressed against the spring 11, another end of the card 7 is removed from between the peripheral portion 4a of the opening 8a and the installation plate 9. Then one end is removed from between the peripheral portion 4a of the opening 8a and the installation plate 9. Thus, the card 7 can be extracted from the mounting portion 8.

The relationships between the card mounted and the periphery of the mounting portion 8 is described below.

The distance between the right and left side walls 4b of the mounting portion 8 is approximately:

(card length)d+(amount of protrusion of one peripheral portion 4a)a+(gap)α,

The card 7 is in contact with the side wall located on the opposite side where the spring 11 is located. The side wall in which the spring 11 is located is spaced from the end surface of the card 7 by:

a+α.

The amount of protrusion b of the peripheral portion 4a in the region having the spring 11 is given by the following expression:

b=2a+(gap)β.

The length e of the card coming-off preventing portion of the peripheral portion 4a in the region having the spring is calculated as follows:

$$\begin{aligned} e &= b - (a + \alpha) \\ &= 2a + \beta - (a + \alpha) \\ &= a + \beta - \alpha \end{aligned}$$

where, α@β
e=a.

Thus, the card coming-off preventing length e of the peripheral portion 4a in the region having the spring is identical to the amount of protrusion of one peripheral portion 4a.

A card 7 is compactly designed so that it can be carried easily, and accordingly input keys are arranged distally near the circumference of the front face of the card. Therefore, it is preferable for better operability that the amount of protrusion of each peripheral portion 4a covering the front face of the card 7 is made as small as possible. Then, the amount of protrusion is set to a minimum within a design restriction while ensuring mechanical strength. Therefore, it is very preferable that the length e of the card coming-off preventing portion e of the peripheral portion 4a on the side having the spring is made identical to the amount of protrusion of one peripheral portion 4a.

Peripheral portions 4a which are designed to prevent a card 7 from coming off are protruded in lateral direction of the main unit of the data input/output apparatus. This is because the fore and back parts of the main unit 1 of the system should be wide open so that the card 7 can be operated while viewing input keys on the card from the front of the apparatus.

Unless the dent 9a is formed on the bottom of the mounting portion 8 and/or the chamfered portions $4a_1$ is formed at the lower end corner of the peripheral portions 4a on the shorter sides of the opening, when a card 7 is inclined and inserted, the card 7 and mounting portion 8 gall each other. This makes it necessary to make the peripheries higher or much wider than the thickness of the card. Therefore, it becomes impossible to restrict the set card vertically. Eventually, a light receiving unit and a light emitting unit cannot come in close contact with each other.

As described previously, according to the invention, a data input/output apparatus includes a mounting portion on which a data memory card having data input keys is freely detachably mounted. Therein, an opening of the mounting portion is shaped in such a way that one pair of opposing sides is slightly shorter than that of the card and another pair of opposing sides is slightly longer than that of the card. The first and second peripheral portions on another pair of opposing sides are protruded, and a pressing means is provided to position a card in a direction parallel with the bottom of the mounting portion. A dent formed in part of the bottom of the mounting portion near a side wall of the mounting portion in the region provided with the pressing means, and/or a chamfered portion formed at the lower end corner of the first peripheral portion is provided. Thereby, the depth of the mounting portion can be approximated to the thickness of the card. Even if the card is mounted onto the mounting portion carelessly, the card is positioned in the mounting portion assuredly. Then, no gap is created between a light receiving unit and a light emitting unit. This eliminates a transmission failure due to insufficient light or incorrect data transmission due to incident external light. As a result, data can be transmitted correctly.

What is claimed is:

1. A data input/output apparatus, comprising:

a card mounting portion on which a data memory card having data input keys and first means for transmitting data is detachably mounted, said card mounting portion being formed with a recessed portion to receive the data memory card and having an open portion so that input keys of the received data memory card can be operated, with the depth of the recessed portion approximating the thickness of the card positioned in said mounting portion, and said open portion having a first pair of opposing sides slightly shorter in length than the card and a second pair of opposing sides slightly longer in length than the card, and said second pair of opposing sides being provided with first and second protruded peripheral portions;

communication means for communicating data between the first means and second means provided in said card mounting portion for receiving data from the card;

biasing means for biasing the card in a direction parallel with a bottom surface of said card mounting portion when the card is mounted on said card mounting portion; and guide means for guiding the card to said card mounting portion so that the first means can communicate with said second means, said guide means including a chamfered portion at a lower corner of said first peripheral portion proximate to said biasing means, said chamfered portion guiding one end of the card inward so that the card may be mounted onto said card mounting portion.

2. A data input/output apparatus according to claim 1, wherein the distance from a side wall of said card mounting portion proximate to said biasing means to an end surface of said second peripheral portion is longer than the card.

3. A data input/output apparatus according to claim 1, wherein a portion of said biasing means which contacts the card is formed not to protrude beyond said first peripheral portion.

4. A data input/output apparatus according to claim 1, wherein the amount of protrusion of said first peripheral portion proximate to said biasing means is set to be double the amount of protrusion of said second peripheral portion.

5. A data input/output apparatus, comprising:

a card mounting portion on which a data memory card having data input keys and first means for transmitting data is detachably mounted, said card mounting portion being formed with a primary recessed portion to receive the data memory card and having an open portion so that the input keys of the received data memory card can be operated, with the depth of the recessed portion approximating the thickness of the card positioned in said card mounting portion, and the open portion having a first pair of opposing sides slightly shorter in length than the card and a second pair of opposing sides slightly longer in length than the card, and said second pair of opposing sides being provided with first and second protruding peripheral portions;

communication means for communicating data between the first means and second means provided in said card mounting portion for receiving communication data from the card;

biasing means for biasing the card in a direction parallel with a bottom surface of said card mounting portion when the card is mounted onto said card mounting portion; and guide means for guiding the card to said card mounting portion when the card is mounted so that the first means can communicate with said second means, said guide means having a secondary recessed portion on part of said bottom surface near a side wall of said card mounting portion proximate to said biasing means, and said secondary recessed portion guiding one end of the card inward so that the card may be mounted onto said card mounting portion.

6. A data input/output apparatus according to claim 5, wherein the distance from said side wall of said mounting portion to an end surface of said second periphery is longer than the card.

7. A data input/output apparatus according to claim 6, wherein said secondary recessed portion is formed at a position which is closer to a center portion than a portion of said biasing means which contacts the card.

8. A data input/output apparatus according to claim 5, wherein said guide means further includes a chamfered portion formed at a lower corner of said first peripheral portion proximate to said biasing means, and said chamfered portion guides the card inward.

9. A data input/output apparatus according to claim 8, wherein a region of said biasing means which contacts the card is formed not to protrude beyond said first peripheral portion.

10. A data input/output apparatus according to claim 9, wherein the amount of protrusion of said first peripheral portion is set to be double the amount of protrusion of said second peripheral portion.

* * * * *

UNITED STATES PATENT AND TRADEMARK OFFICE
CERTIFICATE OF CORRECTION

PATENT NO. : 5,245,169
DATED : September 14, 1993
INVENTOR(S) : Nakano

It is certified that error appears in the above-indentified patent and that said Letters Patent is hereby corrected as shown below:

COLUMN 1:

Line 41, "in" should be deleted.
Line 42, "07/538,344" should read --07/539,344-- and "proposes" should read --, now U.S. Patent No. 5,061,892, proposes--.

COLUMN 4:

Line 9, "LBD" should read --LED--.
Line 28, "$N_7$" should read --$L_7$--.
Line 29, "$N_6$" should read --$N_7$--.

COLUMN 6:

Line 7, "$\alpha ~@~ \beta$" should read --$\alpha \simeq \beta$--.

Signed and Sealed this

Sixteenth Day of August, 1994

Attest:

BRUCE LEHMAN

Attesting Officer  Commissioner of Patents and Trademarks